US012120491B1

(12) United States Patent
Fessard et al.

(10) Patent No.: US 12,120,491 B1
(45) Date of Patent: Oct. 15, 2024

(54) AUXILIARY MICROPHONE AND METHODS FOR IMPROVED HEARING IN SMART GLASS APPLICATIONS

(71) Applicant: Meta Platforms Technologies, LLC, Menlo Park, CA (US)

(72) Inventors: Julian Joseph Maurice Fessard, Mountain View, CA (US); Zhaonian Zhang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 70 days.

(21) Appl. No.: 17/832,440

(22) Filed: Jun. 3, 2022

Related U.S. Application Data

(60) Provisional application No. 63/235,563, filed on Aug. 20, 2021.

(51) Int. Cl.
*H04R 3/00* (2006.01)
*G10L 21/0208* (2013.01)
*H04R 1/08* (2006.01)

(52) U.S. Cl.
CPC .......... *H04R 3/005* (2013.01); *G10L 21/0208* (2013.01); *H04R 1/08* (2013.01); *H04R 2499/15* (2013.01)

(58) Field of Classification Search
CPC ............................ H04R 3/005; H04R 2499/15
See application file for complete search history.

(56) References Cited

U.S. PATENT DOCUMENTS

2016/0112811 A1* 4/2016 Jensen ................ G10L 21/0232 381/17
2018/0359572 A1* 12/2018 Jensen ................ H04R 25/407

* cited by examiner

*Primary Examiner* — Ping Lee
(74) *Attorney, Agent, or Firm* — McDermott Will & Emery LLP

(57) ABSTRACT

An augmented reality headset is provided that includes a first microphone mounted on a headset and configured to receive a first audio signal from a speaker, and a second microphone remotely located from the headset and configured to receive a second audio signal from the speaker. The augmented reality headset also includes a memory storing multiple instructions, and one or more processors configured to execute the instructions. When the one or more processors execute the instructions, they cause the augmented reality headset to: synchronize the first audio signal and the second audio signal, form an enhanced audio signal with the first audio signal and the second audio signal, and provide the enhanced audio signal to a user of the augmented reality headset.

17 Claims, 4 Drawing Sheets

AUXILIARY MICROPHONE AND METHODS FOR IMPROVED HEARING IN SMART GLASS APPLICATIONS

CROSS-REFERENCE TO RELATED APPLICATIONS

The present disclosure is related and claims priority under 35 U.S.C. § 119(e) to U.S. Provisional Pat. Appl. No. 63/235,563, entitled AUXILIARY MICROPHONE AND METHODS FOR IMPROVED HEARING IN SMART GLASS APPLICATIONS, to Julian FESSARD, et al., filed on Aug. 20, 2021, the contents of which is hereinafter incorporated by reference in their entirety, for all purposes.

BACKGROUND

Field

The present disclosure is related to audio accessories and associated software for enhanced reality wearable devices and applications. More specifically, the present disclosure is related to auxiliary microphones for improved audio to users of smart glasses.

Related Art

Accessories for wearable devices are typically mounted within the device itself, leaving little room for improving sensor signals by correlating spatially distributed sensors. This hindrance is especially challenging in the case of audio signals and microphones, wherein to obtain good noise cancelation it is desirable that two or more microphones be distributed over a distance of several feet, or even yards, making it unfeasible to apply noise cancelation and interference elimination in wearable device configurations.

BRIEF DESCRIPTION OF THE DRAWINGS

In the figures, elements having the same or similar reference numerals have the same or similar attributes, unless explicitly stated otherwise.

SUMMARY

Figure 1:
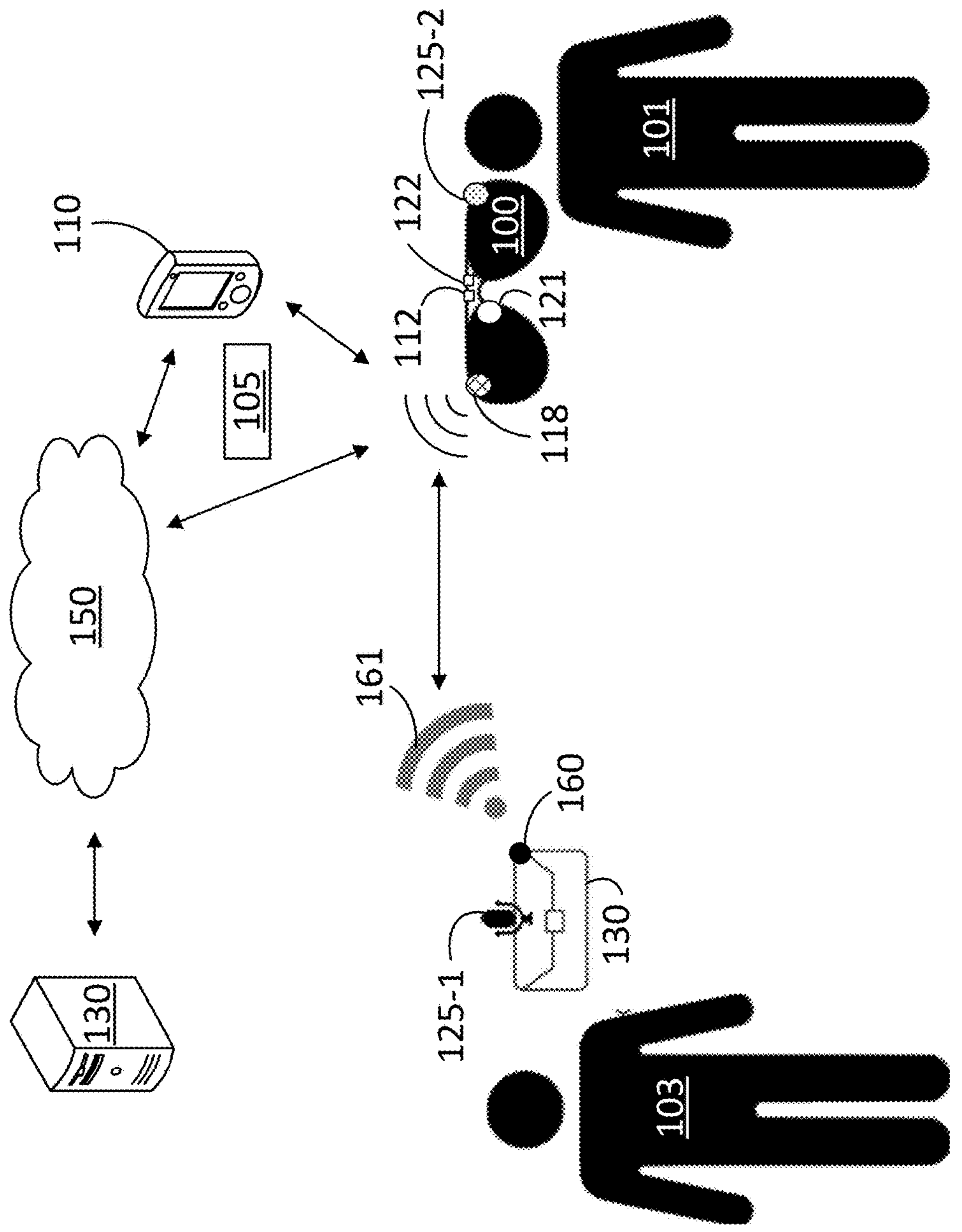
FIG. 1 illustrates a smart glasses user and a speaker engaged in conversation, according to some embodiments.

In a first embodiment, a computer-implemented method includes receiving, in a first microphone, a first audio signal from a speaker, wherein the first microphone is mounted on an augmented reality headset worn by a user, and receiving, in a second microphone, a second audio signal from the speaker, wherein the second microphone is remotely located from the augmented reality headset. The computer-implemented method also includes synchronizing the first audio signal and the second audio signal, forming an enhanced audio signal with the first audio signal and the second audio signal, and providing the enhanced audio signal to the augmented reality headset.

In a second embodiment, a headset includes a first microphone mounted on the headset and configured to receive a first audio signal from a speaker, a second microphone remotely located from the headset and configured to receive a second audio signal from the speaker, a memory storing multiple instructions, and one or more processors configured to execute the instructions. When the one or more processors execute the instructions, they cause the system to synchronize the first audio signal and the second audio signal, to form an enhanced audio signal with the first audio signal and the second audio signal, and to provide the enhanced audio signal to a user of the headset.

In a third embodiment, a computer-implemented method includes receiving, in a mobile device paired to an augmented reality headset worn by a user, a first audio signal from a first microphone mounted on the augmented reality headset, and receiving, in the mobile device, a second audio signal from a second microphone remotely located from the augmented reality headset. The computer-implemented method also includes providing the first audio signal and the second audio signal to a remote server, receiving, from the remote server, an enhanced audio signal formed with the first audio signal and the second audio signal, and providing the enhanced audio signal to the augmented reality headset, for the user.

In yet other embodiments, a system includes a first means for storing instructions and a second means for executing the instructions to cause the system to perform a method. The method includes receiving, in a first microphone, a first audio signal from a speaker, wherein the first microphone is mounted on an augmented reality headset worn by a user, and receiving, in a second microphone, a second audio signal from the speaker, wherein the second microphone is remotely located from the augmented reality headset. The method also includes synchronizing the first audio signal and the second audio signal, forming an enhanced audio signal with the first audio signal and the second audio signal, and providing the enhanced audio signal to the augmented reality headset.

In other embodiments, a system includes a memory storing instructions and one or more processors configured to execute the instructions and cause the system to perform a method. The method includes receiving, in a first microphone, a first audio signal from a speaker, wherein the first microphone is mounted on an augmented reality headset worn by a user, and receiving, in a second microphone, a second audio signal from the speaker, wherein the second microphone is remotely located from the augmented reality headset. The method also includes synchronizing the first audio signal and the second audio signal, forming an enhanced audio signal with the first audio signal and the second audio signal, and providing the enhanced audio signal to the augmented reality headset.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in Appendix I, filed concurrently herewith.

In the context of the present disclosure, an enhanced reality (ER) device may include headsets, goggles, or smart glasses configured to provide the user an immersive experience by either recreating a virtual reality (VR) environment, or augmenting a real image provided by the glasses or other optical elements with virtual features ("augmented reality," or AR). To create an immersive perception for the user, in addition to visual aspects, it is desirable to also enhance the audio perception for the user, either by canceling or eliminating noise sources and other interfering sounds, by enhancing a selected speaker voice and speech, or by enhancing a certain environment sound (e.g., a water stream, a bird chirping, glasses and utensils clicking) that may immerse the user into a certain environment.

Smart glasses (e.g., AR headsets) and other wearable devices for use in ER applications as disclosed herein include features to improve conversation quality by eliminating background noise and interferences and by improving speech intelligibility from one or more speakers addressing the user, or engaged in conversation with or near the user. Existing wearable devices are limited in the location and placement of onboard microphones and sensors, even with proper phased array configurations. Accordingly, embodiments as disclosed herein resolve this limitation by placing at least one or more auxiliary microphones in a charging case for the smart glasses, which may be located a few feet or even yards away from the user.

FIG. 1 illustrates a user 101 of AR headset 100 and a speaker 103 engaged in conversation with user 101. In some embodiments, user 101 may be engaged in conversation with a group of speakers, or a group of speakers may be engaged in conversation amongst each other, aware or unaware of the presence of user 101. In some embodiments, smart glass 100 may include a charging case 130, or a carrying case having a microphone 125-1 and wireless emitter 160, to be communicatively coupled and/or paired to smart glasses 100. Accordingly, in a crowded place (bar, restaurant, and the like), case 130 could be placed near one or more speakers 103 and be used as either an ambient microphone 125-1 to help with noise cancellation, or because it's close to speaker 103, it helps pick out their audio and relay it to AR headset 100 for playback, while removing some of the ambient audio. The audio signal picked by microphone 125-1 in the charging case may be relayed back to AR headset 100 via an electromagnetic (EM) signal 161 (e.g., radiofrequency signal, Wi-Fi, BlueTooth, and the like). Microphone 125-1 may also be used as a second microphone when having conference calls, or similar other use cases.

In some embodiments, AR headset 100 may include multiple sensors 121 and microphones 125-2 mounted within the frame. Sensors 121 may include motion sensors, accelerometers, gyroscopes, and cameras. In addition, AR headset 100 may include a memory circuit 122 storing instructions, and a processor circuit 112 configured to execute the instructions to cause smart glasses 100 to perform, at least partially, some of the steps in methods consistent with the present disclosure.

In some embodiments, an AR headset as disclosed herein may further include a communications module 118 enabling smart glasses 100 to wirelessly communicate a data packet 105 with a mobile device 110 for user 101, or with a remote server 130 via a network 150. Communications module 118 is configured to interface with network 150 to send and receive information, such as data, requests, responses, and commands to other devices on network 150. In some embodiments, communications module 118 can include, for example, radio-frequency hardware (e.g., antennas, filters analog to digital converters, and the like) and software (e.g., signal processing software). Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like. Smart glasses 100 may thus receive and provide data and instructions from mobile device 110 or remote server 130, to perform at least partially some of the operations in methods as disclosed herein.

Figure 2:
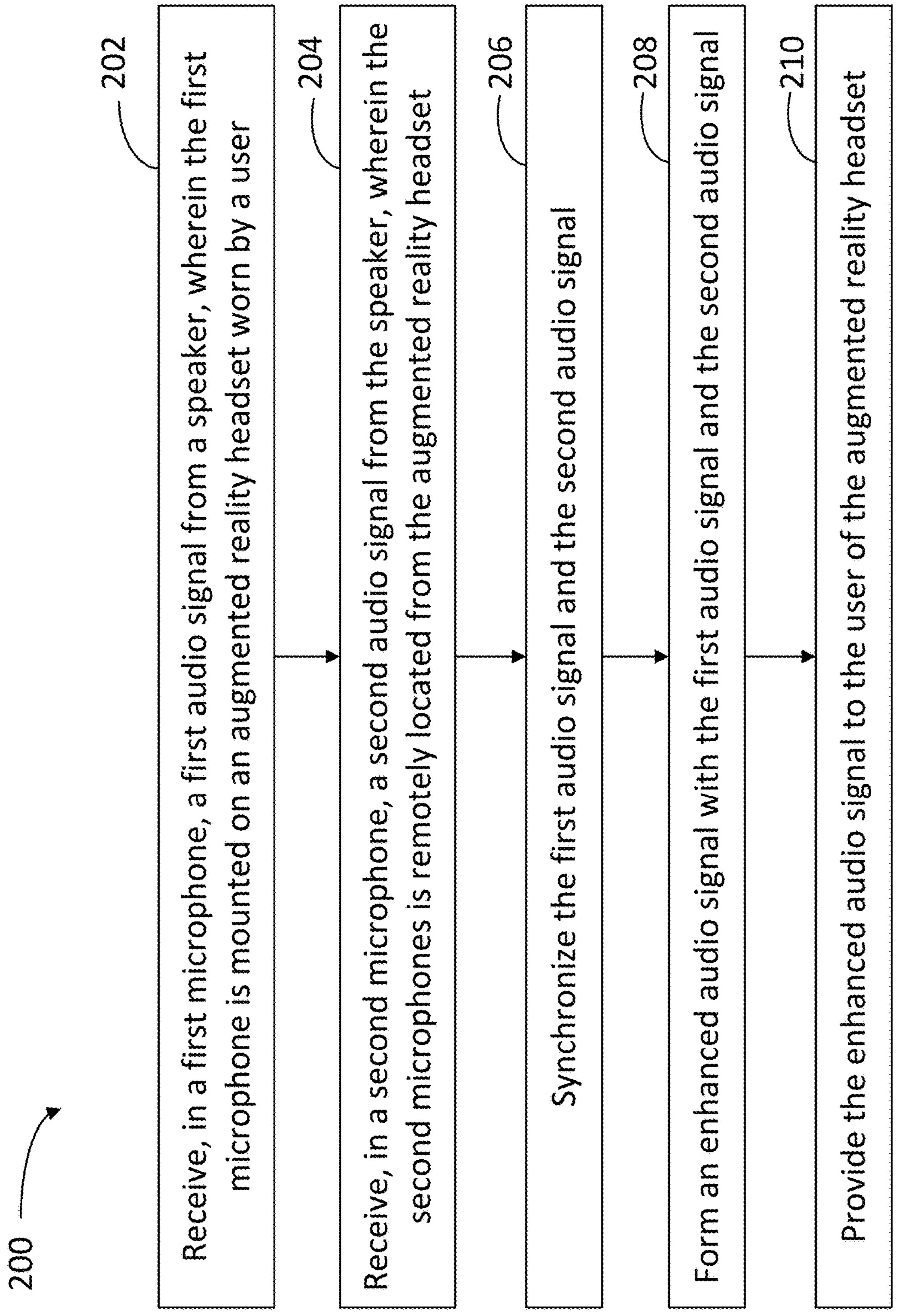
FIG. 2 is a flowchart illustrating steps in a method for enhancing an audio signal for a headset, according to some embodiments.

FIG. 2 is a flowchart illustrating steps in a method 200 consistent with the present disclosure. Accordingly, at least one or more of the steps in method 200 may be performed by a processor circuit executing instructions stored in a memory circuit within an AR headset, as disclosed herein (e.g., processor 112 and memory 122, AR headset 100). In some embodiments, at least some of the steps in method 200 may be performed by a mobile device or a remote server, wirelessly communicating with the smart glasses directly or via a network (e.g., mobile device 110, server 130, and network 150). Moreover, methods consistent with the present disclosure may include at least one or more of the steps in method 200 performed in different order, simultaneously, quasi-simultaneously, or overlapping in time.

Step 202 includes receiving, in a first microphone, a first audio signal from a speaker, wherein the first microphone is mounted on an AR headset worn by a user. In some embodiments, step 202 includes selecting the speaker via a user manual input in a control in the AR headset. In some embodiments, step 202 includes selecting the speaker via a user input in a virtual control displayed on an eyepiece of the AR headset. In some embodiments, step 202 includes selecting the speaker automatically from a user audio and multiple audio signals from multiple speakers.

Step 204 includes receiving, in a second microphone, a second audio signal from the speaker, wherein the second microphone is remotely located from the AR headset. In some embodiments, step 204 includes receiving a wireless electromagnetic signal containing the second audio signal; and decoding the wireless electromagnetic signal to retrieve the second audio signal. In some embodiments, step 204 includes receiving a wireless electromagnetic signal containing the second audio signal; and decoding the wireless electromagnetic signal to retrieve the second audio signal.

Step 206 includes synchronizing the first audio signal and the second audio signal. In some embodiments, step 206 includes selecting at least one audio component that is common to the first audio signal and the second audio signal.

Step 208 includes forming an enhanced audio signal with the first audio signal and the second audio signal. In some embodiments, step 208 includes identifying a noise source in the second audio signal; and removing the noise source from the first audio signal. In some embodiments, step 208 includes identifying a unique feature from the speaker in the second audio signal; and amplifying the unique feature in the enhanced audio signal. In some embodiments, step 208 includes identifying a unique environment feature in the second audio signal; and amplifying the unique environment feature in the enhanced audio signal.

Step 210 includes providing the enhanced audio signal to the user.

Figure 3:
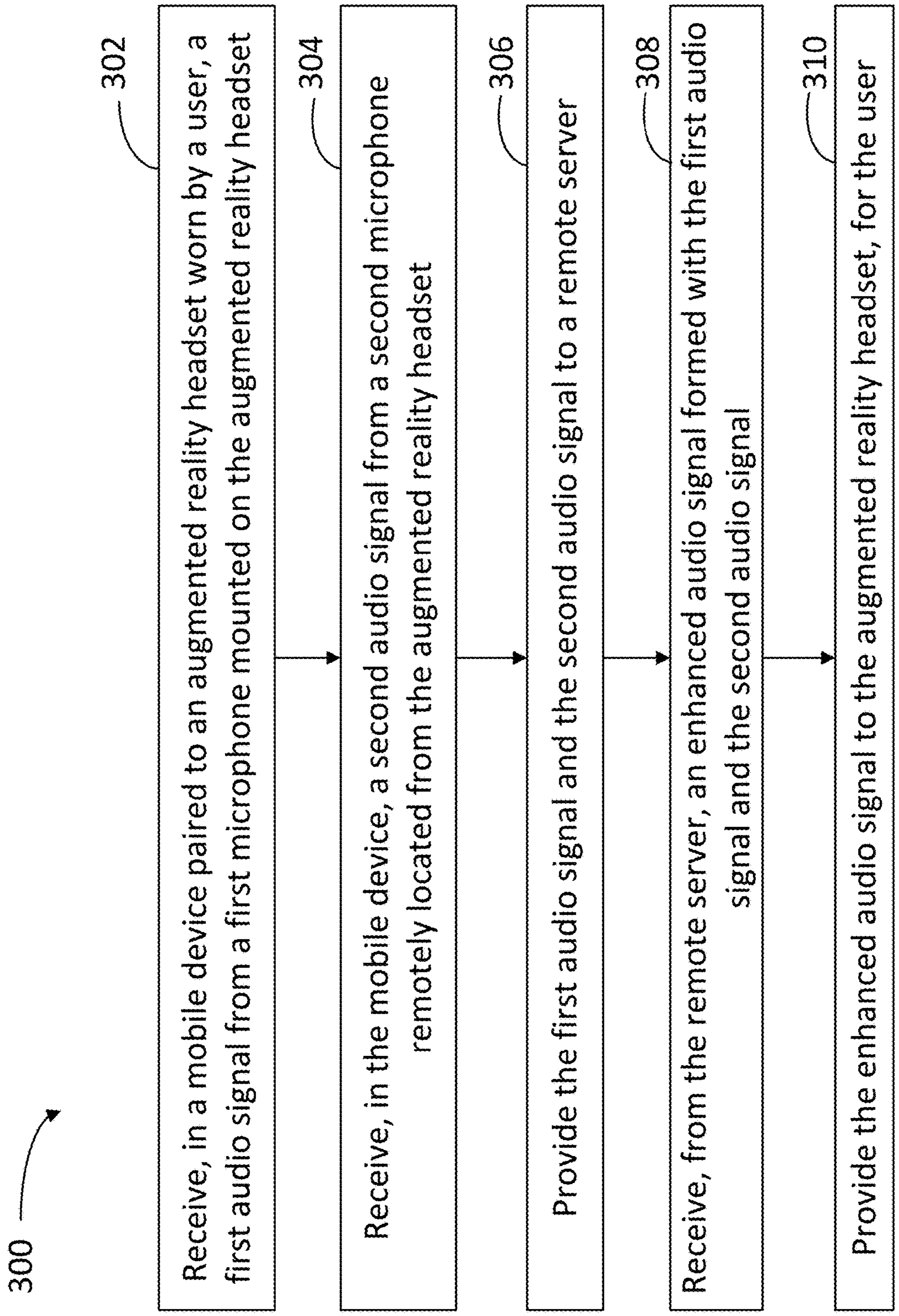
FIG. 3 is a flowchart illustrating steps in a method for pairing multiple microphones to enhance an audio signal for a headset, according to some embodiments.

FIG. 3 is a flowchart illustrating steps in a method 300 for pairing multiple microphones to enhance an audio signal for a headset, according to some embodiments. Accordingly, at least one or more of the steps in method 300 may be performed by a processor circuit executing instructions stored in a memory circuit within a smart glass, as disclosed herein (e.g., processor 112 and memory 122). In some embodiments, at least some of the steps in method 300 may be performed by a mobile device or a remote server, wirelessly communicating with the AR headset directly or via a network (e.g., mobile device 110, server 130, and network 150, and AR headset 100). Moreover, methods consistent with the present disclosure may include at least one or more of the steps in method 300 performed in different order, simultaneously, quasi-simultaneously, or overlapping in time.

Step 302 includes receiving, in a mobile device paired to an AR headset worn by a user, a first audio signal from a first microphone mounted on the AR headset. In some embodiments, step 302 includes receiving, from the AR headset, a selection of a source for the first audio signal.

Step 304 includes receiving, in the mobile device, a second audio signal from a second microphone remotely located from the AR headset. In some embodiments, step 304 includes selecting an audio component that is common to the first audio signal and the second audio signal, and synchronizing the first audio signal with the second audio signal based on the audio component. In some embodiments, step 304 includes identifying a noise source in the second audio signal, and removing the noise source from the first audio signal. In some embodiments, step 304 includes identifying a unique feature from an audio source in the second audio signal, and amplifying the unique feature before providing the second audio signal to the remote server.

Step 306 includes providing the first audio signal and the second audio signal to a remote server.

Step 308 includes receiving, from the remote server, an enhanced audio signal formed with the first audio signal and the second audio signal.

Step 310 includes providing the enhanced audio signal to the AR headset, for the user.

Hardware Overview

Figure 4:
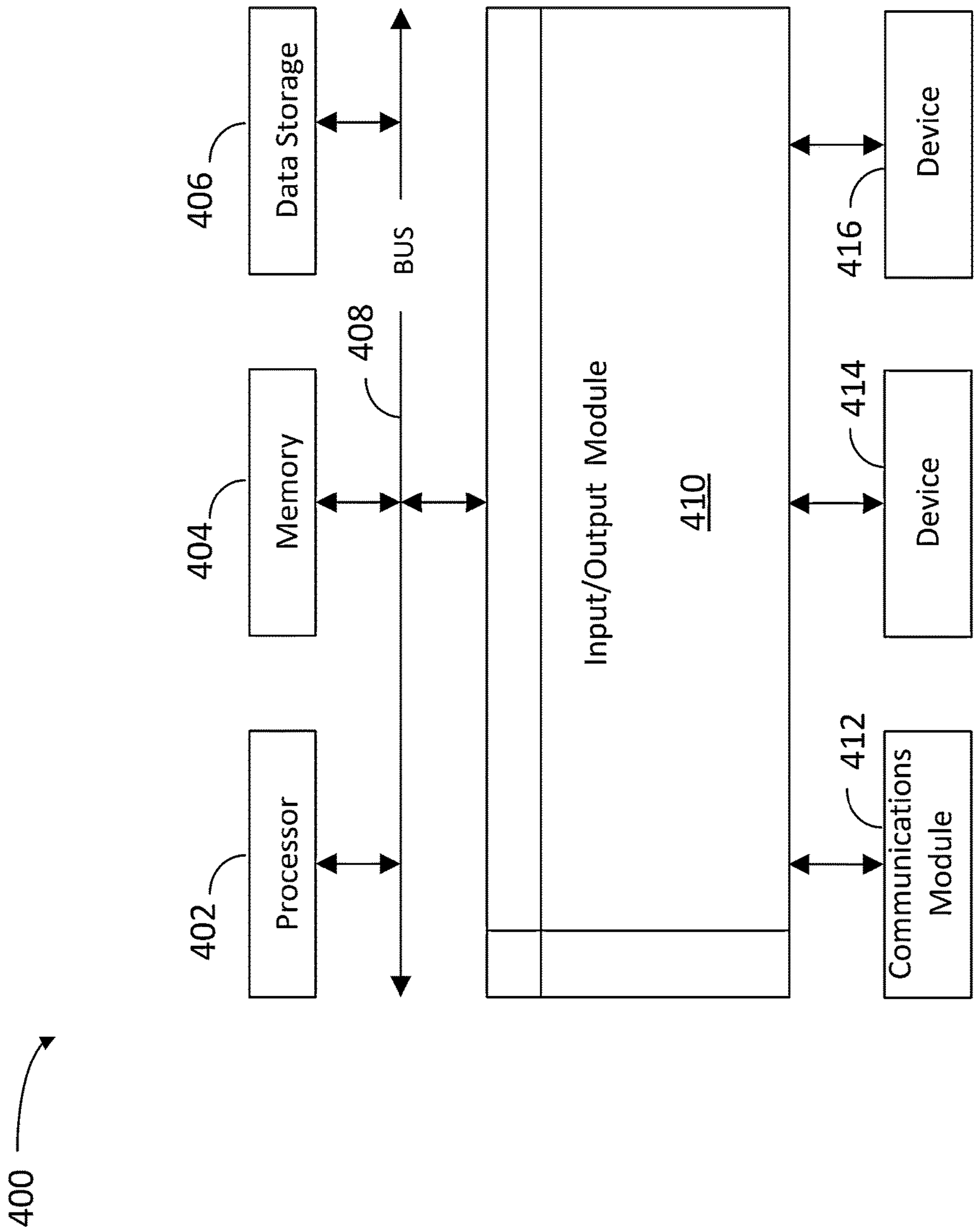
FIG. 4 is a block diagram illustrating a computer system for implementing a headset and methods for use thereof, according to some embodiments.

FIG. 4 is a block diagram illustrating a computer system for implementing a headset and methods for use thereof, according to some embodiments. In certain aspects, computer system 400 may be implemented using hardware or a combination of software and hardware, either in a dedicated server, or integrated into another entity, or distributed across multiple entities. Computer system 400 may include a desktop computer, a laptop computer, a tablet, a phablet, a smartphone, a feature phone, a server computer, or otherwise. A server computer may be located remotely in a data center or be stored locally.

Computer system 400 includes a bus 408 or other communication mechanism for communicating information, and a processor 402 (e.g., processor 112) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 122), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, e.g., one or more modules of computer program instructions encoded on a computer-readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled with bus 408 for storing information and instructions. Computer system 400 may be coupled via input/output module 410 to various devices. Input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, input/output module 410 is configured to connect to a plurality of devices, such as an input device 414 and/or an output device 416. Exemplary input devices 414 include a keyboard and a pointing device, e.g., a mouse or a trackball, by which a consumer can provide input to the computer system 400. Other kinds of input devices 414 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 416 include display devices, such as an LCD (liquid crystal display) monitor, for displaying information to the consumer.

According to one aspect of the present disclosure, smart glasses 100 can be implemented, at least partially, using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires forming bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:

receiving, in a first microphone, a first audio signal from a speaker, wherein the first microphone is mounted on an augmented reality headset worn by a user;

receiving, in a second microphone, a second audio signal from the speaker, wherein the second microphone is remotely located from the augmented reality headset;

synchronizing the first audio signal and the second audio signal;

forming an enhanced audio signal with the first audio signal and the second audio signal, wherein forming the enhanced audio signal comprises:

identifying a noise source in the second audio signal, and removing the noise source from the first audio signal; and providing the enhanced audio signal to the augmented reality headset.

2. The computer-implemented method of claim 1, wherein receiving the first audio signal from the speaker comprises selecting the speaker via a user manual input in a control in the augmented reality headset.

3. The computer-implemented method of claim 1, wherein receiving the first audio signal from the speaker comprises selecting the speaker via a user input in a virtual control displayed on an eyepiece of the augmented reality headset.

4. The computer-implemented method of claim 1, further comprising selecting the speaker automatically from a user audio and multiple audio signals from multiple speakers.

5. The computer-implemented method of claim 1, wherein receiving the second audio signal comprises: receiving a wireless electromagnetic signal containing the second audio signal; and decoding the wireless electromagnetic signal to retrieve the second audio signal.

6. The computer-implemented method of claim 1, wherein synchronizing the first audio signal and the second audio signal comprises selecting at least one audio component that is common to the first audio signal and the second audio signal.

7. The computer-implemented method of claim 1, wherein forming the enhanced audio signal comprises: identifying a unique feature from the speaker in the second audio signal; and amplifying the unique feature in the enhanced audio signal.

8. The computer-implemented method of claim 1, wherein forming the enhanced audio signal comprises: identifying a unique environment feature in the second audio signal; and amplifying the unique environment feature in the enhanced audio signal.

9. The computer-implemented method of claim 1, wherein forming the enhanced audio signal comprises selecting to use the second audio signal to either one of enhancing a speaker voice or neglecting a noise background.

10. A headset, comprising:

a first microphone mounted on the headset and configured to receive a first audio signal from a speaker;

a second microphone remotely located from the headset and configured to receive a second audio signal from the speaker;

a memory storing multiple instructions; and one or more processors configured to execute the instructions and cause the headset to:

synchronize the first audio signal and the second audio signal;

form an enhanced audio signal with the first audio signal and the second audio signal, wherein to form the enhanced audio signal, the one or more processors are configured to:

identify a noise source in the second audio signal, and remove the noise source from the first audio signal; and provide the enhanced audio signal to a user of the headset.

11. The headset of claim 10, further comprising an eye tracking module to identify a gaze direction of the user, wherein the one or more processors execute instructions to select the speaker based on the gaze direction.

12. The headset of claim 10, further comprising a display having a virtual control to receive a user selection of a sound source for one of the first audio signal or the second audio signal.

13. The headset of claim 10, wherein to form the enhanced audio signal, the one or more processors are configured to: identify a unique feature in the second audio signal; and amplify the unique feature in the enhanced audio signal.

14. A computer-implemented method, comprising:

receiving, in a mobile device paired to an augmented reality headset worn by a user, a first audio signal from a first microphone mounted on the augmented reality headset;

receiving, in the mobile device, a second audio signal from a second microphone remotely located from the augmented reality headset;

providing the first audio signal and the second audio signal to a remote server;

forming an enhanced audio signal with the first audio signal and the second audio signal, wherein forming the enhanced audio signal comprises:

identifying a noise source in the second audio signal, and removing the noise source from the first audio signal;

receiving, from the remote server, the enhanced audio signal; and providing the enhanced audio signal to the augmented reality headset, for the user.

15. The computer-implemented method of claim 14, wherein receiving the first audio signal comprises receiving, from the augmented reality headset, a selection of a source for the first audio signal.

16. The computer-implemented method of claim 14, further comprising selecting an audio component that is common to the first audio signal and the second audio signal; and synchronizing the first audio signal with the second audio signal based on the audio component.

17. The computer-implemented method of claim 14, further comprising: identifying a unique feature from an audio source in the second audio signal; and amplifying the unique feature before providing the second audio signal to the remote server.

* * * * *